(12) United States Patent
Gaffney et al.

(10) Patent No.: US 8,626,420 B2
(45) Date of Patent: Jan. 7, 2014

(54) GAS TURBINE SEQUENCING METHOD AND SYSTEM

(75) Inventors: Peter Gaffney, Carlow (IE);
Christopher Hills, Bracknell (GB)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 13/402,495

(22) Filed: Feb. 22, 2012

(65) Prior Publication Data
US 2013/0218437 A1    Aug. 22, 2013

(51) Int. Cl.
*G06F 19/00* (2011.01)

(52) U.S. Cl.
USPC .......................................... 701/100

(58) Field of Classification Search
USPC .................................. 701/99–100
See application file for complete search history.

(56) References Cited

U.S. PATENT DOCUMENTS

| 3,919,623 | A | * | 11/1975 | Reuther .......................... 322/15 |
| 3,974,643 | A | | 8/1976 | Smith et al. |
| 4,195,231 | A | * | 3/1980 | Reed et al. .................. 290/40 R |
| 7,840,333 | B2 | | 11/2010 | Mehrer et al. |

* cited by examiner

*Primary Examiner* — Yonel Beaulieu
(74) *Attorney, Agent, or Firm* — Hiscock & Barclay LLP

(57) ABSTRACT

A method to develop a software based sequencer for a turbine including: selecting a general purpose sequencer software module having standardized software for sequencing turbines through defined states of operation; selecting options from predefined settings presented by the sequencer software module, wherein the selected options define operational events of the turbine which trigger the sequencer to transition the turbine from one of the defined states to the next defined state, and using the general purpose sequencer software configured with the selected options for the settings.

20 Claims, 2 Drawing Sheets

GAS TURBINE SEQUENCING METHOD AND SYSTEM

BACKGROUND OF THE INVENTION

The invention relates to sequencing the operational states of a turbine, and particularly to developing sequencing algorithms for controlling the operational states for industrial gas and steam turbines.

Industrial gas and steam turbines typically operate at predefined operational states. With respect to a gas turbine, these states relate to starting the gas turbine, accelerating the gas turbine to a rotational speed (load speed) for driving a load for power generation or a mechanical device, and shutting down the gas turbine. As an example, the operational states during startup may include starting auxiliary devices for the gas turbine, mechanically rotating the shaft of the gas turbine, and initiating ignition of combustion in the gas turbine. Other operating states are associated with accelerating the gas turbine to an idle or no-load speed, running the gas turbine at speed and under load, and shutting down the gas turbine. An industrial gas turbine operates at one of its predefined operational states. A steam turbine will also have predefined operating states and will transition between its operating states.

A software program generally referred to as a sequencer determines the current operational state of a turbine, selects the next operational state and determines when to transition from the current to the next operational state. The sequencer software module is conventionally stored and executed by a computer control system for the gas turbine.

The control system may execute other software modules which generate control commands to operate specific components of the gas turbines, typically referred to as auxiliary systems. These auxiliary systems may control the: fuel valves that regulate fuel flow to the gas turbine, starter motor that mechanically turns the compressor and turbine, instruments and sensors monitoring the gas turbine, mechanical actuators for the inlet guide vanes (IGVs), and pumps for oil and fuel. The sequencer software program communicates with the other software modules to monitor the operation of the gas turbine and notify the other modules as to the state of the turbine.

Current day sequencing software modules are written for a specific turbine model or family of models. Once written, the software instructions are tested to confirm that they properly control the turbine and are free of error. The tested software instructions are documented with comments in the software coding and manuals for using and configuring the sequencing module to a specific gas turbine. The writing, testing and documentation of the sequencing module for a new model or family of models of turbines are time consuming, expensive and require software programmers and engineers familiar with the operation of the specific gas turbine.

Historically, sequencing modules are designed and developed specifically for each model of an industrial gas turbine. Some individual manufacturers of industrial gas turbines have developed multi-model sequencers for a related group of models, such as a product family of gas turbines. These sequencing modules are limited to the gas turbine model(s) for which they are designed. Traditionally, sequencing modules have not been adapted to control gas turbines beyond those models for which the sequencing module was initially designed.

While some existing sequencing modules created for one turbine have been adapted to work on other models of turbines, this ad hoc approach to adapting sequencing modules introduces risks that the adaptation of the sequencing module does not properly sequence the new turbine through its operating states. This ad hoc approach is not an efficient approach for developing sequencers for a large number of turbine models.

Because they are custom developed for each new model or family of models of gas turbines, the sequencing modules for different models/families of gas turbines have large variations in their software structure and software instructions. To work with the sequencing modules of different models/families of gas turbine requires knowledge of the software in each module. A person qualified to work on a sequencer for one gas turbine model may not be qualified to work on the sequencer of another gas turbine module or may not be knowledgeable of subtle but important differences between sequencers for different turbines.

In view of the cost and time required to develop a gas turbine sequencer and the variations between sequencers for different models, there is a long felt and unmet need for methods and systems to reduce the cost and time required to develop sequencing modules for a wide range of models of a gas turbine.

BRIEF DESCRIPTION OF THE INVENTION

A method has been conceived to develop a software based sequencer for a turbine including: selecting a general purpose sequencer software module having standardized software for sequencing turbines through defined states of operation; selecting options from predefined settings for the sequencer software module, wherein the selected options identify operational events of the turbine which trigger the sequencer to transition the turbine from one of the defined states to the next defined state, and using the general purpose sequencer software configured with the selected options to transition the turbine between the defined states.

A general purpose sequencer has been conceived for a turbine wherein the sequencer is a configurable software module that when configured is stored in a non-transitory memory of a computer controller of the turbine, wherein the configured sequencer guides the turbine through a defined sequence of states and based on defined events prompting the sequencer to transition the turbine between the states, wherein the sequencer is standardized to be applicable over a wide variety of turbines and is configured based on selectable options.

DETAILED DESCRIPTION OF THE INVENTION

Figure 1:
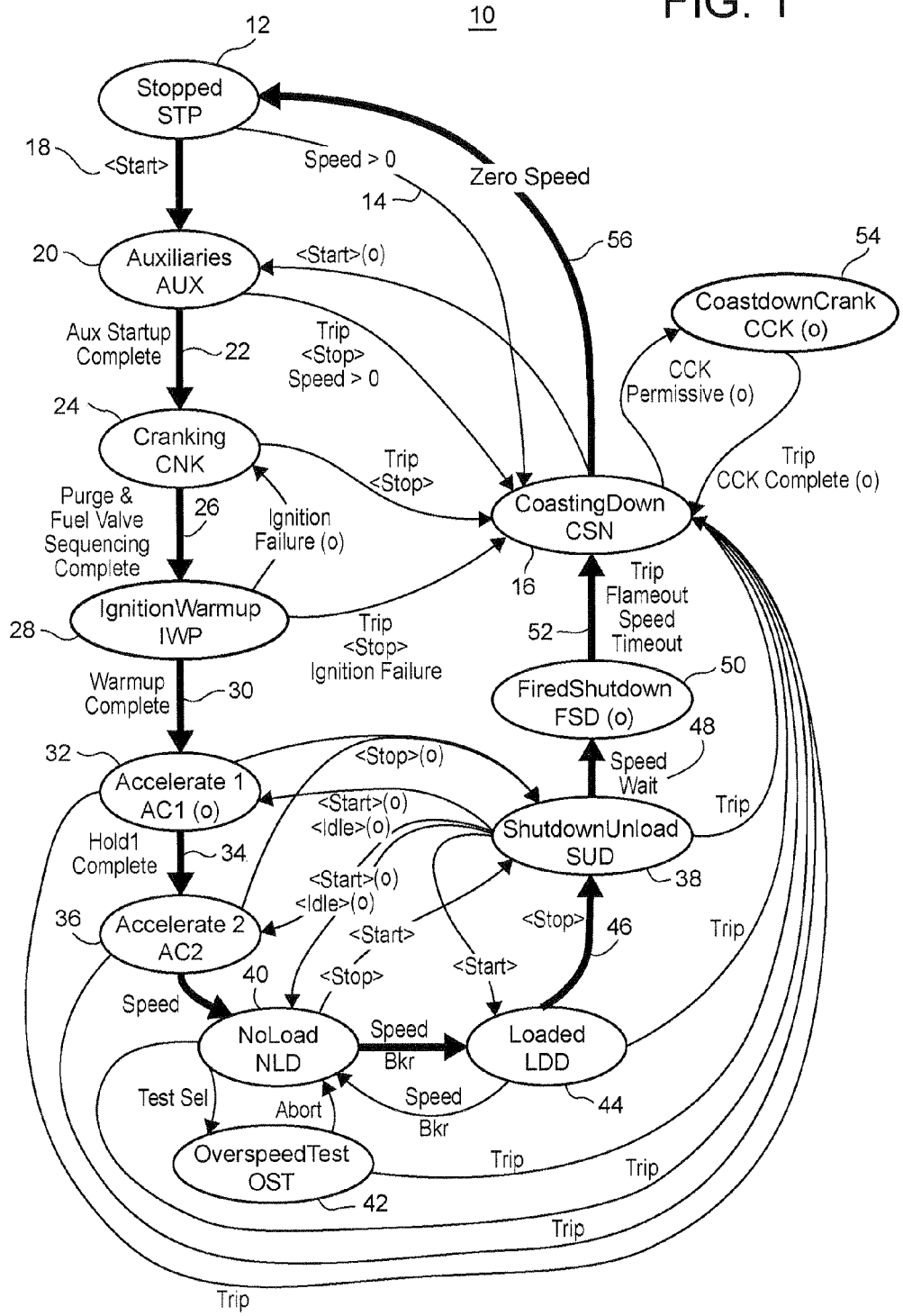
FIG. 1 is a state diagram showing the operation of an embodiment of a generic sequencer for controlling an industrial gas turbine.

Industrial turbines have various configurations and constructions. For example, an industrial gas turbine may: have from one to three main shafts, use a variety of liquid and gas fuels with different types of mixed-fuel operation, and drive a generator or other mechanical device. Further, the operation of an industrial gas turbine may vary substantially from one model to another. For example, operational characteristics of an industrial gas turbine may vary with respect to: behaviors relating to idle-speeds, flying restarting, droop behavior, synchronizing, coast down cranking, local or remote control, and a tremendous variety in the controls for auxiliary systems.

The inventors realized that all or nearly all current day industrial gas turbines, despite their large differences, sequence through a fairly uniform set of operational states. The inventors conceived of a generic sequencer that determines which of the uniform states in which a turbine should operate and transitions the turbine to a next one of the states for a wide range of industrial turbines and, for example, all current day industrial gas turbines. The generic sequencer will be configured for each turbine by selecting predefined options from a modest number of standard settings. The settings and options allow the generic sequencer to be configured to sequence any individual industrial gas turbine through the uniform state of states.

The inventors conceived of a standard software module for a general purpose sequencer and limited the configuration of the sequencer to selecting predefined options for a reasonable number of settings. A technical effect achieved by the general purpose sequencer is that it is based on a standard software module which can be easily configured for a specific gas turbine.

The general purpose sequencer provides several possible benefits including: i) reduced testing needed to validate a sequencer for a specific gas turbine: ii) reduce risk of errors and increased safety of turbine operation because the general purpose sequencer has been extensively tested; iii) reduced training by operators on new gas turbines because the operators will have been trained on other sequencers based on the generic sequencer; iv) suppliers of components and service personnel who work on gas turbines will be familiar with a sequencer on any gas turbine having a sequencer is based on the generic sequencer; v) efficient and fast development, testing and documentation of a sequencer for a specific gas turbine, and vi) customers of gas turbines will enjoy a high degree of uniformity of the sequencers on all of various models of their gas turbines.

A general purpose turbine sequencer has been implemented as a state machine. The sequencer is a device, e.g., software module, that determines the operational state of a turbine and initiates transitions from one state to another depending on the operating conditions of the turbine. The sequencer guides the turbine through the various phases of operation such as starting, accelerating, loading, unloading and shutting down. A sequencer software module may be implemented in the control software of a turbine.

A general purpose sequencer, also referred to as a generic sequencer, is disclosed herein that may be easily configured to control all or at least a wide variety of models of a gas turbine. A general purpose sequencer specific to steam turbines may also be easily configured to control a wide variety of steam turbines. While the general purpose sequencer may be specific to gas turbines or steam turbines, it need not be specific to a model or family of models of a steam or gas turbines. For example, the general purpose sequencer may be applied as a standard sequencer for industrial gas turbines in general, industrial gas turbines made by a specific turbine manufacturer or industrial gas turbines operated by a specific entity, such as a power generation utility.

The general purposes sequencer is configured to be a specific sequencer software module for a particular turbine. The general purpose sequencer is configured based on the specific application and structure of the gas turbine and the auxiliary devices associated with the gas turbine. For example, the sequencer may be applied to gas turbines having one, two or three coaxial shafts coupling the compressors and turbines. The gas turbine may combust gas or liquid fuel, and may drive an electrical generator or another type of machine.

The general purpose sequencer may be applied to control an industrial turbine by configuring the sequencer in a manner that does not change the software structure of the sequencer or rewrites the software code in the sequencer. Configuring the sequencer may involve inputting information regarding the characteristics of the turbine, selecting operational states and transition conditions for the turbine and inputting values for the selected conditions. The human operator configuring the sequencer may be guided through these selections by user interface software provided by a software development tool for configuring the general purpose sequencer. Once configured, the sequencer may be stored in and executed by controller of the turbine.

The general purpose sequencer has successfully undergone a proof-of-concept experiment. The general purpose sequencer has been applied to generate a sequencer for a commercially operating industrial gas turbine controller.

FIG. 1 is state diagram 10 for a general purpose sequencer for industrial gas turbines. The general purpose sequencer includes standard software architecture having a standardized software code. The sequencer has selectable predefined settings which are used to configure the sequencer for a particular gas turbine. The selections of each of the settings may be confined to predefined options. States and transitions that may be optional are indicated in FIG. 1 by the reference (o).

The general purpose sequencer may be a software state machine. The options for the selectable settings may be selected using a graphical user interface generated by a software configuration tool for the sequencer and presented on a computer terminal. The selectable settings may include selections of conditions of the turbine to trigger at least one of the transitions between the states.

The general purpose sequencer may be for a gas turbine, and the states include: stopped, start auxiliary systems, crank the gas turbine, start ignition and warm-up, acceleration, no load and full speed operation, operation under load, unload and shutdown and coast down.

The general purpose sequencer may be configured without altering standardized software in the sequencer. The general purpose sequencer may be configured for a second turbine by selecting options for predefined settings of the sequencer software module to define operational events of the second turbine which will trigger the sequencer to transition the second turbine from one of the defined states to the next defined state, wherein the selected options for the settings define conditions indicating that a transition should occur between the states, and using the general purpose sequencer configured with the selected settings to cause the second turbine to transition between the defined states.

The general purpose sequencer may be configured for a specific gas turbine model having as its operating states: stopped, start auxiliary systems, crank the gas turbine, start ignition and warm-up, acceleration, no load and full speed operation, operation under load, unload and shutdown and coast down.

The general purpose sequencer reduces the time and cost needed to develop a sequencer for a specific gas turbine and, in particular, reduces the time and cost associated with testing and documenting a sequencer. Because the standardized software of the general purpose sequencer is fully tested and documented, it is not necessary to repeat the testing and documentation of the software for each configuration of the sequencer developed for each new gas turbine. Because the changes to the general purpose sequencer are limited to selecting predefined options of certain settings, the changes made while configuring the general purpose sequencer to a specific turbine do not introduce new risks that require and changes that require extensive testing and new documentation of the sequencer configured for the gas turbine.

The general purpose sequencer is disclosed here as a state machine implemented in the software and executed by a computer controller, e.g., main controller, for the gas turbine. The general purpose sequencer need not be a state machine and need not be included in the software of the main controller of the turbine. The same general purpose sequencer state machine can be implemented on any reasonable, modern controller for an industrial gas turbine.

As with any state machine, the general purpose sequencer illustrated in FIG. 1 embodies a set of allowable states and a limited number of conditional transitions between the states. The states and transitions shown in FIG. 1 establish a generic sequencing scheme for an industrial gas turbine that may be configured to control a wide variety of specific industrial gas turbines.

The software structure for the general purpose sequencer may be: a standard sequencer, such as shown in FIG. 1; standardized and configurable controls for auxiliary systems, such as the fuel controller, starter system, pumps for oil and fuel, inlet guide vanes, and custom features of the control system. This standardized software structure ensures that much of the software code is generic to all implementations of the sequencer and does not vary between gas turbines. The settings for configuring the general purpose sequencer are mostly directed to the controls for the auxiliary controls and to structure of the turbine, e.g., whether the turbine has multiple shafts. To the extent that a control system for a particular controller has unique or customized features, the software implementing these unique or customized features may be confined to the portion of the structure of the control system reserved for custom features.

The general purpose sequencer is configured using selectable settings and options enable the sequencer to determine the states and transitions of a particular turbine. While the states and transitions in any one turbine may include conditions specific to a particular transition, the general purpose sequencer has standardized states and transitions that may be configured to account for conditions specific to a particular turbine. For example, a specific condition of a turbine may be analyzed by custom software which generates data used by one of the standardized transitions in the general purposes sequencer.

A software development tool may be used to configure the general purpose sequencer. The characteristics of the turbine and specific transition conditions may be inputted into the development tool. The tool may also allow for input related to settings and values for specific transition conditions and states. The tool analyzes the inputs and configures the sequencer for the specific turbine.

The inputted information regarding turbine characteristics may relate to the whether the load on the turbine is a generator or a mechanical device, the type of fuel burned by the turbine, and the number of concentric shafts in the turbine. The settings selectable for the general purpose sequencer may also relate to various transition conditions and values for the selected transition conditions. The settings for the general purpose sequencer allow the sequencer to be configured for any of the gas turbines for which the sequencer is intended. It is envisioned that modifying the general purpose sequencer beyond selecting the settings should not be necessary and will not be an allowable option for configuring the sequencer.

Each transition allowed by the general purpose sequencer is based on a defined set of transition conditions. A transition condition is an operational characteristic of the turbine, such as completion of the startups of auxiliary systems, completion of purging possibly explosive gases from the compressor and turbine, and completion of the warm-up phase of the gas turbine.

The transition condition shown in FIG. 1 are illustrative and not comprehensive. For example, the transition conditions shown in FIG. 1 are intended to cover a multiplicity of possible conditions and events, and not just the exemplary conditions and events identified in the figure. The general purpose sequencer allows for the selection of the transition conditions associated with a particular turbine while retaining a uniform software architecture and software codes for the sequencer.

The transition conditions are used to configure the general purpose sequencer. A configuration software tool associated with the general purpose sequencer may be used to select the settings for each of the transition conditions associated with a specific gas turbine. For each setting, the configuration software tool may present various predefined options that may be selected and for which values may be inputted.

Many of the transitional conditions may be associated with auxiliary systems of the gas turbines. Auxiliary systems may include the air intake and filter system, exhaust gas system, starter, and fuel supply and controller. The auxiliary systems generally each have a controller that monitor the main sequencer to determine the operating state of the turbine. The controllers for each auxiliary may generate data for the main sequencer. The main sequencer reads data from the auxiliary systems and uses the data to determine when to transition the gas turbine between operating states.

The general purpose sequencer, when configured, detects trip conditions that cause the sequencer to transition the gas turbine to a shutdown state. Trip conditions are typically an abnormal event that potentially could damage the gas turbine. When a trip event occurs, the sequencer transitions the gas turbine to a shutdown state to avoid damaging the gas turbine. Trip conditions are often detected by an auxiliary system which generates a signal to notify the sequencer of the event. The sequencer may calculate some trip events, such as those associated with excessive delays in achieving a desired transition condition.

The sequencer, upon detection of any trip event, may transition the turbine to the same operational state. Because trip events tend to result in the same transition, the sequencer may have common software logic to process all trip events. Further, a trip event may cause the controllers for the auxiliary systems to change In configuring the general purpose sequencer for a specific gas turbine or model/family of gas turbines, some states shown in FIG. 1 may be disabled and not active in the sequencer. For example, optional states include the one of the two acceleration states, a fired shutdown (FSD) state, and coast-down cranking (CCK) state. Disabling a state may also result in disabling certain transitions associated with a disabled state. The disabling of states and transitions may be options selectable when configuring the general purpose sequencer.

The sequencer guides the gas turbines through a sequence of states. These states are shown in FIG. 1 and the normal sequence of states is indicated by the thick black line between each states. The normal sequence of states is: stopped 12, auxiliaries 20, cranking 24, ignition warm-up 28, one or two acceleration states 32, 36, no load and full speed operation 40, operation under load 44, unload for shutdown 38, fired shutdown 50, coasting down 16 and back to stopped 12. A few of these steps are optional. Two additional optional states are shown as the over-speed test 42 and as coast-down cranking. Some of the thin lines shown in FIG. 1 between states represent transitions due to a trip event, which cause the gas turbine to shut down. Other thin lines show alternative transitions such as from the shut-down unload state 38 to prior states which bring the gas turbine back to full speed, full load operation.

The general purpose sequencer begins 12 with the gas turbine in a stopped state 14. In the stopped state, the gas turbine has cooled to well below the normal operating temperatures and has internal passages at atmospheric pressure. The sequencer maintains the turbine in the stopped state while there is no rotation of the main shaft(s). The main shaft(s) connect the turbine and compressor. If rotation is detected in any of the main shafts, the sequencer transitions to a coasting down state 16. While in the stopped state, the sequencer may cause some of the auxiliary units to operate and may cause the main shaft(s) to turn to cool the turbine if it is too hot.

A transition to the coasting down state 16 can result from any other state, if a "trip" condition is detected in the gas turbine. A trip condition is typically an abnormal condition and generally indicates a serious problem with the operation of the gas turbine. The trip condition may vary depending on state in which the sequencer is operating the gas turbine. The trip condition is a rotation detected in a main shaft for the stopped state 12.

When the gas turbine receives a command to start, the sequencer transitions 18 to an auxiliary startup state to start 20 selected ones of the auxiliary devices. While in the auxiliary startup state, the sequencer generates control signals to start or initiate the auxiliary systems. While the turbine itself is still shutdown, many auxiliary system operate, such as the hydraulic system.

Each auxiliary system typically may have its own controller and sequencing software module. The operation of the auxiliary system is governed by its controller and sequencer. When the auxiliary system has performed a desired task or achieved a desired state, the controller for the auxiliary reports the completion to the sequencer for the gas turbine.

The auxiliary startup state is typically entered from the stopped state. For turbines having a flying restart feature, the auxiliary startup state may be entered directly from the coasting down state. A flying restart occurs when a turbine is restarted before the main shafts reach a zero speed condition. Generally, a flying restart is initiated when a human operator pushes a start button while the turbine is in the coasting down state. When the start button is pressed, the sequencer confirms the presence of certain predefined conditions required before initiating a restart by transitioning the turbine to the auxiliary start state.

When the required auxiliary controls report successful startup, the sequencer automatically transitions to the cranking state. During the auxiliary startup state, a trip condition may occur if there is an unexpected and significant speed or the machine operator pushes the stop button.

If rotation in the main shaft is detected while in the auxiliary startup state, the sequencer transitions to the coasting down state 16 and stops preparing for startup. However, for turbines having a flying restart function, the sequencer may be configured to remain in the auxiliary startup state while the main shaft rotates.

When the sequencer determines that the auxiliary systems have been started and are ready 22 for the start of rotation of the main shafts, the sequencer transitions to a cranking (CNK) state 24. This state is normally entered from the auxiliary systems state and after all necessary auxiliary systems have completed their startup routines. However, on some turbines, when there is a failure to ignite the fuel in the ignition warm-up state, the sequencer allows one or more attempts at ignition. Each attempt is preceded by a transition from the ignition warm-up state back to the cranking state to purge the turbine.

When the sequencer transitions to the cranking state, the starter system should detect the presence of this state and begin staring the turbine. During the cranking state, the turbine is accelerated by the starter system and rotated for a defined period to pass air through the turbine and thereby purge potentially explosive gases from the turbine. The cranking state may also bring the turbine to the correct speed condition for admitting fuel and igniting.

The starter system may turn a main shaft of the turbine. The starter system may turn the shaft by a starter motor, auxiliary power unit or other external drive source. Other main shafts, if present, are typically started as sufficient air flows through the turbine.

During the cranking state, some auxiliary systems may operate pursuant to their respective controller and sequencer. For example, the fuel system may perform certain fuel-valve-related actions and, if the turbine burns gas fuel, check the integrity of the gas fuel block-and-bleed system.

On a normal startup once purging is complete and the fuel valves are ready for fuel and ignition, the turbine is ready to transition to the ignition warm-up state. The sequencer may determine that purging is complete based on the elapse of a predefined period after the turbine reaches a certain speed. The sequencer may read data from the fuel system to determine when it is ready for ignition. However if a trip condition occurs or if an operator pushes the stop button, the sequencer transitions to the coasting down state.

The sequencer monitors the signals from the gas turbine to detect a trip event and if a transition to another state should occur. For example, the signals indicating that the starter system and fuel control system have completed their startup routines may cause the sequencer to transition from AUX stage. Alternatively, upon detection of a condition, e.g., shaft speed greater than zero, the sequencer declares a trip event and transitions the gas turbine to the coast down state 16.

Upon detection that the fuel controller and starter system have completed their startup routines, the sequencer transitions 26 to an ignition warm-up (IWP) state 28. During the ignition warm-up state, the fuel controller ignites the fuel flowing into the combustor and the starter system may continue to accelerate the rotation of the main shafts. The sequencer generates control signals providing notice of the transition to the IWP state to the fuel controller and the starter system. The sequencer may receive a signal indicating whether ignition has occurred in the combustors of the gas turbine or perform a calculation as to whether ignition has occurred based on information about the turbine other than a flame detection sensor. Based on the ignition signals or the lack of ignition signals in certain period, the sequencer may determine that ignition failed and either transition to the coasting down state 16 or to the cranking state 24. The selection of the appropriate transition destination when ignition fails may be selected during the configuration of the general purpose sequencer.

During the IWP state, the sequencer may turn on one or more of the igniters in the combustion section. In general the sequencer does not directly drive the auxiliary systems but rather simply determines the state of the turbine. The controller or sequencer for each of the auxiliary systems monitors the general sequencer to learn the current operating state.

After successful ignition, the turbine is maintained at a low fuel flow to warm up. The sequencer may maintain the turbine in the IWP state for a predetermined period after ignition which is sufficient to allow the turbine to warm-up.

The IWP state may only be entered from the cranking state. If the sequencer determines that the IWP was not successful, it may return to the cranking state before attempting another IWP state.

If ignition is successful and after the expiry of a warm-up timer after ignition, the sequencer transitions the turbine from the IWP state to the accelerate state.

However, if any trip or operator stop occurs during the IWP state, the sequencer transitions to the coasting down state. On some turbines, a failure to ignite the fuel in a prescribed period is a trip event or a stop command, and results in a transition to coasting down state. On other turbines, a failure to ignite condition causes the sequencer to transition to the cranking state before transitioning to another IWP state.

If the IWP state is successfully completed, the sequencer transitions to a first acceleration (AC1) state 32. During the AC1 state, the sequencer monitors the gas turbine, e.g., monitors sensor signals, to determine whether the gas turbine has accelerated to a selected shaft speed.

The trip conditions for the AC1 and AC2 states are set during the configuration of the sequencer and may relate to excessive speeds. If a trip condition occurs, the sequencer transitions from the AC1/AC2 state to the coasting down state 16. If an operator pushes the stop button, the sequencer transitions the turbine from the AC1/AC2 state to a shutdown-unload state (SUD) 38.

During configuration of the sequencer a selection is made as to whether the transitions to an idle condition is to one of the AC1, AC2 and no-load 40 states.

During the AC1 state 32, the turbine is accelerated some of the way towards its no-load speed. The AC1 state is similar to an idling state for the turbine. Some turbines have one or more high-speed shaft idle speeds, which are speeds at which acceleration is halted to allow the turbine to warm-up while the turbine is under a very low load. On units with no idle speeds the AC1 state is a pass-through state such that the sequencer transitions the turbine from the IWP state directly to the AC2 state.

The sequencer may transition the turbine to the AC1 from the IWP state during a normal turbine startup process. The sequencer may also transition to the AC1 state from the shutdown-unload state. The transition from the shutdown-unload state 38 to the AC1 state may be used to restart a turbine that are at or above a minimum load and have one speed for high-speed shaft idling. The transition from shutdown-unload state to AC1 may also be used for turbines that use a stepping-to-idle approach.

During a normal startup and once the sequencer determines that the idle has been completed in the AC1 state, the sequencer transitions the turbine to a second acceleration state (AC2). The AC2 state may be used for turbines having no idle speed, for those having a second high-speed shaft idle speed and for turbines having multi-shafts with full-speed and low-speed shaft idle conditions. Certain auxiliary systems may operated in the AC2/AC1 state, such as to disengage the starter from the shaft, to adjust compressor bleed valves, inlet guide vanes, and adjust the variable stator vanes.

On a normal startup, the AC2 state is entered from the AC1 state and after the turbine achieves a sufficient speed. On multi-shaft units with a second high-speed shaft idle speed, the AC2 state may be entered from the shutdown-unload state if the machine operator pushes a start button or from the turbine has an active step-to-idle transition.

The second acceleration state (AC2) 36 is similar in many respects to the AC1 state in that both states involve accelerating the main shaft of the gas turbine to a selected rotational speed. As with AC1, the trip conditions for the AC2 are set during configuration. The sequencer determines when the AC2 state is completed, such as when the gas turbine has accelerated to a full speed condition. The definition of the full speed condition may be established as a setting during the configuration of the sequencer.

Once the turbine reaches a sufficient speed during a normal startup process, the sequencer transitions from the AC2 state to a no-load state (NLD). The transition to the NLD state may be viewed as the completion of the startup phase of the turbine operation. If the operator pushes the stop button, the sequencer will transition the turbine from the AC2 state to the shutdown-unload state.

The no load (NLD) state 40, may be a full speed no load state of the turbine. The turbine is running a zero load or at approximately zero load.

For turbines driving a generator, the zero load condition can be achieved by keeping open the generator breaker. For turbines driving mechanical devices, the no load condition may be defined as the turbine running within an prescribed speed range.

The turbine enters the NLD state when a normal startup phase is completed and the sequencer determines that the state should transition from the AC2 state to the NLD state, which typically occurs when the turbine reaches a predetermined speed. The sequencer maintains the turbine in the NLD state, for example, until the sequencer determines that a no-load warm-up period has expired.

The sequencer may transition the turbine to the NLD state 40 from a loaded state 44 if the generator breaker opens on a generator-drive turbine or if the speed of the load falls below a threshold speed for a turbine driving a mechanical unit. The sequencer may also transition the turbine from a shutdown-unload state to the NLD state if the operator pushes the start button while the breaker is open (for a generator drive turbine) or the load speed is in the no-load band (for a mechanical drive turbine).

On turbines with no idle speeds, which nonetheless have a stepping-to-idle function, a step-to-idle operation will cause the sequencer to transition the turbine from the shutdown-unload state to the NLD state. Further, if an over-speed test state is turned off or aborts before the completion of the test, the sequencer will transition the turbine from the over-speed test state to the NLD state.

The sequencer may transition the turbine from the NLD state to various other states, depending on the conditions of the turbine. The sequencer transitions the turbine to a loaded state, if sequencer determines that the load has been applied to the turbine such as by the closure of the generator breaker or if a turbine driving a mechanical unit accelerates beyond a certain speed. The sequencer may transition the turbine between the NLD and loaded states repeatedly as the turbine is subjected to changes in loading.

The sequencer will transition the turbine from the NLD state to the shutdown-unloaded state, if the operator pushes the stop button. If the turbine has an active step-to-idle function and this state is not the destination state for stepping-to-idle then this state will transition to the shutdown-unload state en route to the AC1 or AC2 states.

If a trip condition occurs while the turbine is in the NLD state 40, the sequencer transitions the turbine to the coast down-crank state. The trip conditions for the NLD are established during the configuration of the sequencer and may include failure to maintain a steady speed.

If the operator requests over-speed testing while the turbine is in the NLD state, the sequencer transitions the turbine from the NLD state to the over-speed test (OST) state 42 provided that the sequencer determines the presence of predefined permissive conditions.

The sequencer transitions the turbine to the OST state only from the NLD state and in response to a request by an operator. Before transitioning to the OST state, the sequencer may confirm that certain conditions, e.g., permissives, are present.

The OST state is typically a special case of the NLD state, and used for turbine shaft over-speed testing. During the OST state, one of the turbine shafts may be accelerated to a certain fast speed while sensors monitor the turbine. Over-speed testing is performed while the turbine is unloaded, such as by an open generator breaker or a mechanical unit decoupled from the turbine. While the sequencer maintains the turbine in the OST state, the sequencer does not itself perform the over-speed test.

A successful over-speed test results in a trip condition. When the trip condition occurs, the sequencer transitions the turbine to the coast-down crank state. The sequencer may transition the turbine from the OST to the NLD state, if the over-speed test is aborted before the occurrence of the trip condition. The OST test may be aborted by operator intervention, loss of a test permissive, by a request for a stop or an active step-to-idle.

The sequencer transitions to the LDD state 44 upon completion of the NLD state 40. The LLD state is entered from the NLD state by either closing the generator breaker or by raising the turbine speed into the speed band for loaded operation. The LDD state is generally a gas turbine driving a generator will operate at or near the same speed as the NLD state. During the LDD state, a turbine coupled to a generator runs with its generator breaker closed. In contrast, a generator driving a mechanical unit runs in a no-load speed band during the NLD state and is accelerated to a faster speed band for the LDD state. The load control system and other auxiliary systems that operate during loaded operation may read from the sequencer that the turbine is in the LDD state.

The sequencer may transition the turbine to the LDD state from the shutdown-unload state, if an operator presses the restart button while the turbine is shutting down and if the generator breaker is closed or the turbine speed is in the speed band.

If the turbine becomes unloaded such as by the breaker opening or the speed dropping below the speed band, the sequencer transitions the turbine to the NLD state. If the stop button is pressed, the sequencer will transition the turbine from the LDD state to the shutdown-unload state to ramp down the load and shut down the turbine. Similarly, if a step-to-idle function is invoked the sequencer transitions the turbine from the LDD state to the shutdown-unload state and then to the appropriate state, e.g., AC1, AC2 or NLD, for the stepping-to-idle function. Further, a trip condition will cause the sequencer to transition the turbine from the LDD state to the coasting-down state.

When a shutdown/stop signal is received, the sequencer transitions 46 the gas turbine to the SUD state 38. The SUD state is the initial state in a shutdown process. During the SUD state the sequencer may monitor the gas turbine as the load on the turbine is reduced. During the SUD state, the turbine is runs under load or no load as its speed ramps down and to allow controlled cooling to reduce the thermal shock to the turbine. The SUD state is a pass-through state for when step-to-idle conditions arise during the AC1, AC1, NLD, OST and LDD states.

During a normal shutdown and after the unloading of the turbine followed by a prescribed idle or waiting time 48, the sequencer transitions the turbine from the SUD state to the fired-shutdown (FSD) state 50. If a trip event occurs during the SUD state, the sequencer transitions the turbine to the coasting-down state 16. If an operator requests a restart, the sequencer transitions the turbine to the AC1, AC2, NLD or LDD states depending on the speed when the request is made and the turbine configuration (which affects the configuration of the sequencer). A step-to-idle condition will cause a transition to the AC1, AC2 or NLD states depending on the turbine configuration and the configuration settings made to the sequencer.

During the FSD state 50, gas turbine continues to operate with combustion occurring in the combustion chamber as the speed of the gas turbine slows. During the FSD state, the turbine is not loaded and the fuel to the turbine is slowly ramped downward to slow the turbine and minimize thermal shock to the turbine. The FSD state is only entered from SUD state and after completion of the unloading of the turbine and the expiration of the shutdown idling period.

The FSD state is completed once the flame has been lost in the combustor, a fired shutdown timer has expired or the fuel ramp minimum has been reached. At the completion of the FSD state, the sequencer transitions to coasting-down (CSN) state 16. A trip event in the FSD state causes the sequencer to immediately transition the turbine to the CSN state.

On some turbines, the sequencer may skip the FSD state and transition the turbine directly to the coasting-down state 16. When shutting down a turbine, the transition to the coasting-down state is the point at which the turbine will slow to the stopped state and cannot be restarted until transitioning through the stopped state. While in SUD state 38, the turbine can be restarted back to the LDD state without stopping the turbine. Once the transition is made from the SUD state to the FSD state, the turbine must sequence through the FSD and SUD states and to the shutdown state 12. The FSD state is only entered from SUD state and when unloading and shutdown idling have completed.

During the coasting down (CSN) state 16, the sequencer monitors the gas turbine as it slows to a stop. During the CSN state, fuel does not flow to the turbine and the turbine is coasting down from a full speed operation or from an aborted start. All turbine trips events cause the sequencer to transition the turbine to the CSN state, unless the turbine is already at the stopped state.

The sequencer transitions the turbine to the CSN state at the completion of the FSD state 50, regardless of whether the FSD state was completed by ramping down the fuel when a fired shutdown is required or by stepping quickly through the FSD state when a fired shutdown is not required. The sequencer may also transition the turbine to the CSN state if the operator presses the stop button during the early part of starting up, such as during the AUX, CNK and IWP states.

The sequencer transitions the turbine from the CSN state to the fully stopped STP state 12 when the turbine reaches a nominal zero speed. For some turbines, the sequencer may be configured to allow a flying restart in which the turbine is transitioned directly to the AUX state from the CSN state and before the turbine reaches the nominal zero speed, and provided that certain conditions (permissives) exist.

When stopped, the sequencer transitions 56 the gas turbine to the stopped state 12. To transition to the stopped state, the sequencer may generate control signals which complete the shut down of the gas turbine, such as signals to shut down the auxiliary systems. During configuration of the sequencer, the control signals may be selected to be generated to complete the shut down.

The sequencer may transition the gas turbine to a coast down crank (CCK) state 54 as a temporary state occurring during what otherwise would be the CSN state. During the CCK state, the starter system drives the speed of the gas turbine to move cooling air through the turbine.

During the CCK state, the starter is engaged to crank the turbine. The CCK state (also referred to as cooldown cranking) allows the turbine to turn while it cools and thereby minimize the risk that the turbine bows due to being hot when stopped. The CCK state can only ever be entered from the CSN sate. If the CCK state is used, the sequencer automatically transitions the turbine from the CSN state to the CCK state when the sequencer determines that certain conditions (permissives) are satisfied. The permissives may include the shaft speed being slower than a threshold speed and that the turbine was fired to a high enough temperature to warrant the cranking. When the sequencer determines that the coast-down cranking timer has expired or if there is a trip, the sequencer transitions the turbine from the CCK state to the CSN state.

Figure 2:
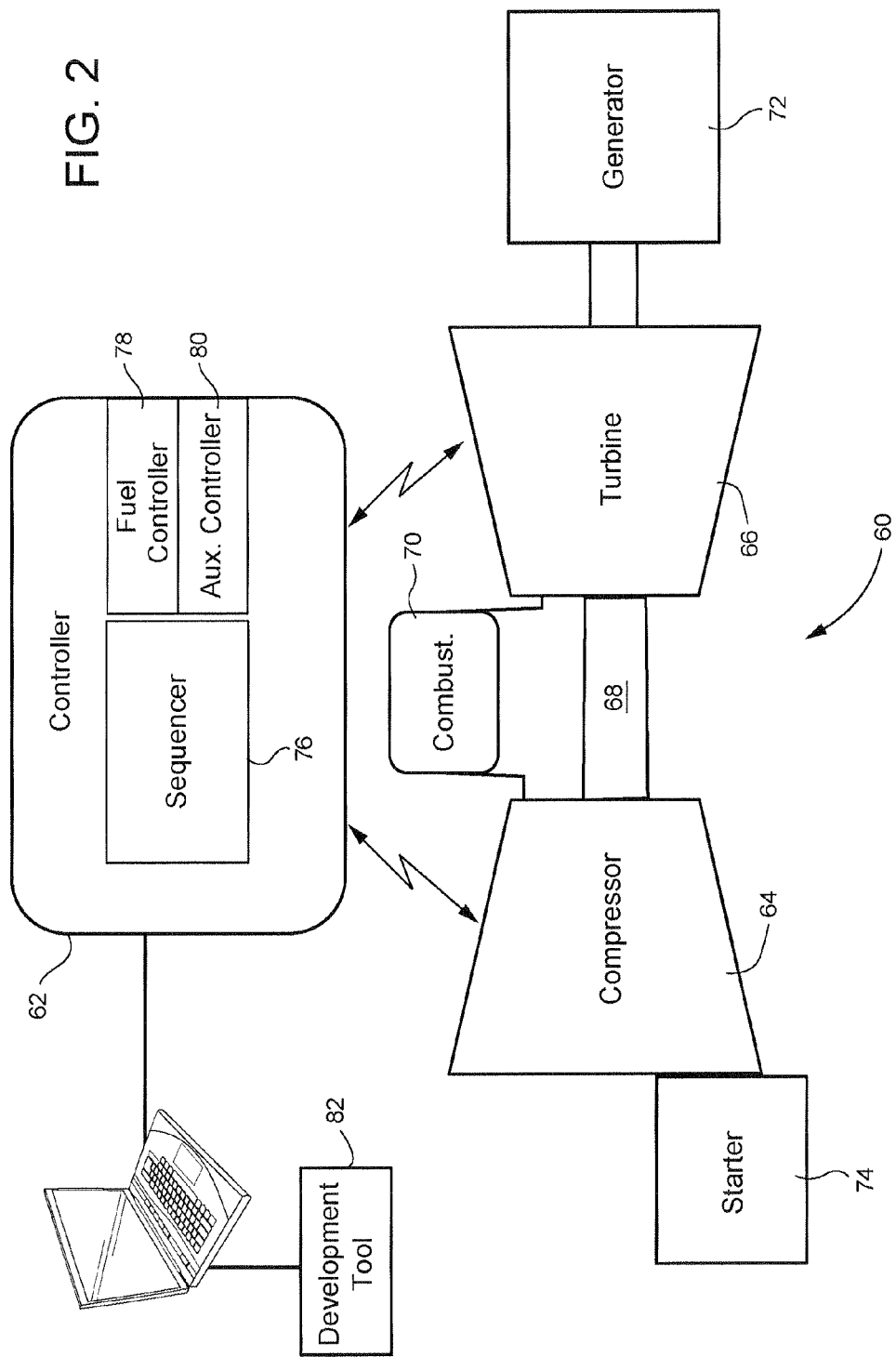
FIG. 2 is a schematic diagram of a gas turbine having a controller with a sequencer.

FIG. 2 is a schematic diagram showing a gas turbine 60 having a computer controller 62. The controller may include a processor, non-transitory electronic memory and input and output systems, e.g., ports, to communicate with the various components of the gas turbine.

In addition to the controller, the gas turbine includes a compressor 64, turbine 66 and a main drive shaft(s) 68. A combustion section 70 receives pressurized air from the compressor, mixes fuel with the air, and directs combustion gases to drive the turbine, which in turn drives the compressor and a load 72, such as an electrical generator, pump or compressor. Auxiliary systems, such as fuel and oil pumps, a starter and electronic sensors and servo motors, assist in operating and controlling the gas turbine. These auxiliary systems are represented in FIG. 2 by the starter 74. Other than the software systems in the controller, the gas turbine 60 may be a conventional industrial gas turbine.

The software systems for controlling and operating the gas turbine may be stored in the memory of the controller and executed by the processor. The software systems include a sequencer 76, a fuel controller 78 and controllers 80 for other auxiliary systems, such as the starter.

The sequencer software 76, as implemented on a gas turbine, is based on a standardized general purpose sequencer for an industrial gas turbine. To configure the general purpose sequencer for a specific gas turbine, selections are made with respect to optional states, e.g., AC1, FSD and CCK, and optional transitions between certain states. Selections are also made as to the conditions and their values for the transitions between operating states, and the conditions which trigger a trip transition.

The available settings for setting up the sequencer are standardized. The transitions between states are limited and are selectable using menus generated by a software development tool 82 used to configure the sequencer during configuration. Similarly, menus generated by the sequencer may be used to select or disable the optional states, and to establish the conditions of the gas turbine which are sensed to determine if the gas turbine is operating in a particular operational state.

The software development tool 82 may include a user interface software module that generates text and graphics on a computer terminal having a display and keyboard. The text and graphics provide a structured format for a human user to make selections of states, transition conditions and other configuration settings for tailoring the general purpose sequencer to a specific gas turbine. The structured format may be drop-down menus each associated with options that may be selected for each of the states or regarding the characteristics of the turbine.

The user interface enables a human operator to view the available selections for states and transitions, make selections regarding the states and transitions, and configure the states and transitions allowed by the sequencer. The configuration of the sequencer may be performed on a computer system external to the controller 62, such as the computer terminal of the user interface 82, and thereafter stored in the controller 62. Alternatively, the general purpose sequencer may be stored in the controller and later configured using the user interface 82.

The general purpose sequencer reduces the variation of the various control software generated during different turbine control projects. The general purpose sequencer imposes standardization of the software comprising much of the sequencer and may require standardization of software systems for the controllers of the auxiliary systems, such as the fuel controller, starter controller and other auxiliaries.

The general purpose sequencer aids product and project designers by reducing the need for custom software coding when developing a sequencer for a new turbine. The writing of customized software coding may be limited to selections and need not result in the rewriting of the software code constituting the control software structure for the sequencer.

The general purpose sequencer reduces the cost and risks associated with developing a sequencer for a new turbine. Because the standardized software of the general purpose sequencer is fully tested and documented, it is not necessary to repeat the testing and documentation of the software for a configuration of the sequencer developed for a new turbine. Because the changes to the general purpose sequencer are limited to selecting predefined options of certain settings, the changes made while configuring the general purpose sequencer do not introduce new risks and thereby reduce the amount of testing needed to validate the configured sequencer. Further, the documentation for the general purpose sequencer need not change much for each configuration of the sequencer and, thus, extensive writing of documentation is avoided when configuring the sequencer for a turbine.

The general purpose sequencer should reduce the training of operators of gas turbines by standardizing the operation of the sequencer and the interaction between the sequencer and the operator. The general purpose sequencer aids commissioning personnel at gas turbine sites by providing a standard software model for all sequencers and minimize the need for commissioning personnel to review a large amount of customized software code because the software structure and sequencer specifics do not change even when the sequencer is configured for substantially different turbines.

Standardizing the software for turbine sequencers aids gas turbine customers who operate different turbine models. A standardized sequencing software will have common look and feel characteristics to operators. These operators will find it relatively easy to transition between different models of gas turbines as all are controlled by sequencers having the same software structure. The standardization of turbine sequencers should reduce the risk of human error by minimizing the user interface differences between different models of gas turbines.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to develop a software based sequencer for a turbine comprising:
   receiving selected options from predefined settings for a general purpose sequencer software module, wherein the general purpose sequencer software module has standardized software for sequencing any one of a plurality of turbines through defined states of operation, the standardized software having software code generic to all implementations of the general purpose sequencer software module, wherein the selected options relate to characteristics of the turbine and to conditions of the turbine which will trigger the sequencer to transition the turbine from one of the defined states to the next defined state;
   configuring the general purpose sequencer software module with the selected options; and
   storing the configured general purpose sequencer software in a non-transitory memory.

2. The method of claim 1 wherein the sequencer includes a predefined sequence of the states.

3. The method of claim 1 wherein the selected options further comprise settings which will trigger the sequencer to trip the turbine and transition the turbine towards a shut down state.

4. The method of claim 1 wherein the sequencer is a state machine.

5. The method of claim 1 wherein the selected options are received using a graphical user interface on a computer terminal.

6. The method of claim 1 wherein the selected options further comprise conditions of the turbine which are to trigger at least one of the transitions between the states.

7. The method of claim 1 wherein the sequencer is for a gas turbine, and the states include: stopped, start auxiliary systems, crank the gas turbine, start ignition and warm-up, acceleration, no load and full speed operation, operation under load, unload and shutdown and coast down.

8. The method of claim 1 wherein the configured general purpose sequencer software includes the unaltered standardized software.

9. A method to develop a software based sequencer stored in a non-transitory memory of a computer controller of a turbine, the method comprising:
   selecting a general purpose sequencer software module having standardized software for sequencing any one of a plurality of turbines through defined states of operation, the standardized software having software code generic to all implementations of the general purpose sequencer software module;
   selecting options from predefined settings for the sequencer software module, wherein the selected options relate to characteristics of the turbine and to conditions of the turbine which will trigger the sequencer to transition the turbine from one of the defined states to the next defined state, and
   using, by a processor, the general purpose sequencer software stored in a non-transitory memory and configured with the selected options for the settings to transition the turbine between the defined states;
   configuring the general purpose sequencer software module for a second turbine;
   selecting options for predefined settings of the sequencer software module to define operational events of the second turbine which will trigger the sequencer to transition the second turbine from one of the defined states to the next defined state, wherein the selected options for the settings define conditions indicating that a transition should occur between the states, and
   using the general purpose sequencer software configured with the selected settings to cause the second turbine to transition between the defined states.

10. The method of claim 9 wherein the second turbine is a different turbine model than the first turbine.

11. The method of claim 1 further comprising predefining a transition for each trip event as being a transition to a coasting down state.

12. The method of claim 11 where each of the states has a corresponding trip event, except for the coasting down state and the state in the sequence preceding the coasting down state.

13. The method of claim 1 wherein at least one of the states may be disabled by the selected options.

14. The method of claim 1 wherein the selected options include options to configure the sequencer.

15. A sequencer for a turbine comprising:
    software module for sequencing any one of a plurality of turbines through defined states of operation that is stored in a non-transitory memory of a computer controller of the turbine; and
    settings for the software module that define events which prompt the sequencer to transition the turbine between the states, where the settings are based on selectable options,
    wherein the software module is configured to guide the turbine through a defined sequence of states based on the settings,
    wherein the software module is standardized to be applicable over a wide variety of turbines, the software module having software code generic to all implementations of the software module.

16. The sequencer as in claim 15 wherein the sequencer is for a gas turbine, and the operating states include: stopped, start auxiliary systems, crank the gas turbine, start ignition and warm-up, acceleration, no load and full speed operation, operation under load, unload and shutdown and coast down.

17. The sequencer as in claim 15 wherein the sequencer is a state machine.

18. The sequencer as in claim 15 wherein the selectable options are selected using a graphical user interface on a computer terminal.

19. The sequencer as in claim 15 wherein the selectable options include conditions of the turbine which are to trigger transitions between the states.

20. The sequencer as in claim 15 wherein the selectable options include conditions of the turbine which are to trigger a trip condition to shut down the turbine.

* * * * *